United States Patent Office 3,081,894
Patented Mar. 19, 1963

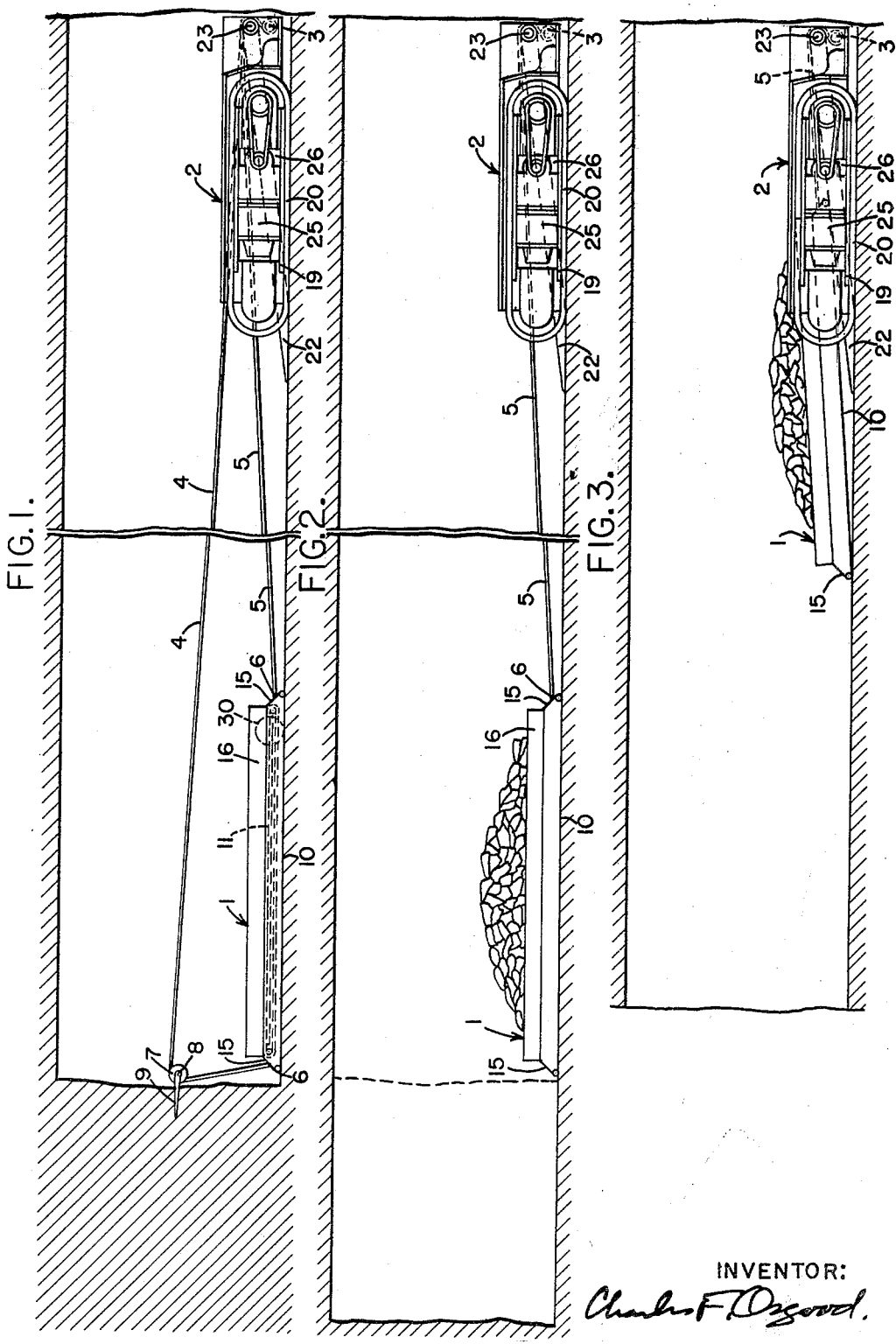

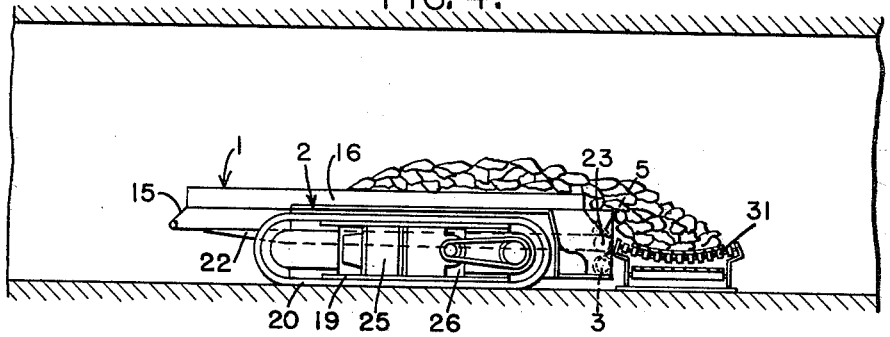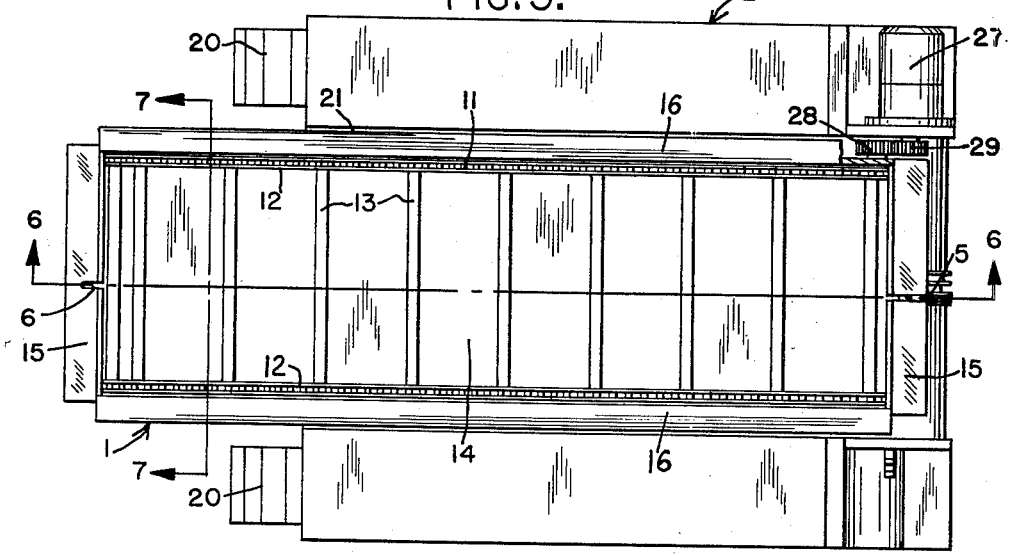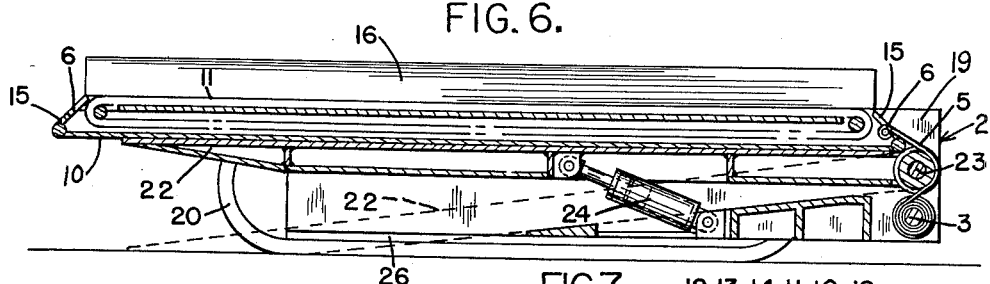

3,081,894
LOW HEIGHT MINE HAULAGE APPARATUS
Charles F. Osgood, Franklin, Pa., assignor to Joy Manufacturing Company, Pittsburgh, Pa., a corporation of Pennsylvania
Filed Apr. 3, 1958, Ser. No. 726,094
13 Claims. (Cl. 214—517)

This invention relates to mine haulage apparatus and more particularly to a shuttle mechanism especially designed for use in low vein mines whereby the mineral dislodged from a mine vein may be conveyed to a remote point.

Mine haulage vehicles such as those known as shuttle cars usually have a load carrying body mounted on rubber tired propelling and steering wheels and provided with a conveyor extending longitudinally along the bottom of the load carrying compartment. Such vehicles are relatively complicated and costly and are usually too high for use in mines having very low headroom. The present invention contemplates improvements over known types of haulage vehicles in that a shuttle mechanism is provided for use in very low vein mines and which is not only very low in height but is also relatively simple and inexpensive in design, especially adapted for use in relatively small mining operations such as truck mines.

In accordance with the present invention there is provided a relatively flat, low height bottom skid slidable on its own bottom over the mine floor and having a low height load carrying conveyor extending lengthwise thereof, and the skid may be moved back and forth over the mine floor with respect to a transport vehicle by means of haulage cables wound on drums carried by the transport vehicle. The skid when loaded may be slid up a ramp of the vehicle into transport position on the frame thereof and the skid conveyor when the skid is in transport position on the vehicle may receive its power from a power device which may be mounted on the transport vehicle.

It is therefore an object of this invention to provide an improved mine haulage apparatus of a novel construction. Another object is to provide an improved shuttle mechanism for mines having very low headroom and for use in relatively small mining operations. A further object is to provide an improved shuttle mechanism comprising a relatively flat, low height floor engaging skid for receiving a load and having a conveyor for discharging the load therefrom. A still further object is to provide a floor engaging skid which may be moved over the mine floor by a cable haulage means and which may be moved onto a transport vehicle by which the drums of the haulage means are carried. Yet another object is to provide a skid transport vehicle which carries means for driving the skid conveyor when the skid is in transport position thereon. Another object is to provide a skid transport vehicle wherein the skid may be loaded onto the transport vehicle from one end and may discharge the mineral loaded thereon from the opposite or rear end of the vehicle. These and other objects and advantages of the invention will, however, hereinafter more fully appear.

In the accompanying drawings there are shown for purposes of illustration one form and a modification which the invention may assume in practice.

In these drawings:

FIG. 1 is a vertical section through a mine passageway showing the improved haulage apparatus in operating position with the haulage skid disposed close to the face of a mine vein.

FIG. 2 is a view similar to FIG. 1, showing the face blasted down and the dislodged mineral loaded onto the haulage skid.

FIG. 3 is a similar view showing the haulage skid in its position during loading thereof onto the transport vehicle.

FIG. 4 shows the skid in loaded position on the transport vehicle with the skid conveyor acting to discharge the mineral from the skid onto a floor conveyor or other receptacle.

FIG. 5 is an enlarged plan view of the haulage apparatus showing the skid in transport position on its vehicle.

FIG. 6 is a longitudinal vertical section taken on line 6—6 of FIG. 5, showing details of the skid-conveyor and transport vehicle.

FIG. 7 is a cross section through the conveyor-skid taken on line 7—7 of FIG. 5.

FIG. 8 is a longitudinal vertical section through a conveyor-skid of a modified construction.

In this illustrative embodiment, as shown in the drawings, a haulage skid generally designated 1 is slidable on its own bottom over the floor of a mine and is movable onto a transport vehicle generally designated 2. Flexible draft means comprising haulage drums 3 on the rear end of the transport vehicle have flexible draft connections in the form of haulage cables 4 and 5 wound thereon and these cables are attachable at 6 to the opposite ends of the skid. The upper cable 4 passes around a pulley or guide sheave 7 carried by a bracket 8 anchored at 9 to the face of the mine vein.

The haulage skid 1 has a bottom floor engaging shoe 10 of a relatively flat, low height design and extending lengthwise of the skid is an endless flight conveyor 11 of low height having side chains 12 and connected cross flights 13. The cross flights of the top runs of the conveyor chains move along a horizontal plate 14 secured to the sides of the skid frame and this plate provides a relatively large, imperforate load receiving surface. The ends of the skid frame have inclined portions 15 extending from the floor level upwardly to the top run of the conveyor. The skid may have vertical side frames 16 which may be detachable, or omitted as shown in FIG. 7, to decrease its height. In the modification shown in FIG. 8, the skid frame has frame portions 17 articulated at 18 with the pivot located within the orbit of the endless conveyor and, if desired, additional points of articulation may be provided to facilitate movement of the skid over an undulating floor or rolling bottom.

The transport vehicle 2 has a frame 19 mounted on crawler treads 20 arranged at the sides of a guideway 21 provided lengthwise of the vehicle-frame. A ramp 22 pivoted at 23 may be tilted by a conventional hydraulic jack or jacks 24 to facilitate loading of the skid onto or discharge of the skid from its guideway on the vehicle frame. The crawler treads 20 may be driven by motors 25 (FIG. 4) carried within the tread side frames 26.

During operation of the haulage apparatus the conveyor skid may be brought up close to the working face as shown in FIG. 1 and the cable 4 and its guide sheave 7 may be detached from the face. The face may then be drilled and blasted down in a well-known manner and the dislodged mineral falls from the face upon the skid and the adjacent floor surfaces. The remaining loose mineral on the floor may be shoveled by hand or otherwise loaded onto the skid conveyor. The haulage drums 3 may then be driven by a motor 27 on the transport vehicle to wind in the cable 5 to drag the loading skid over the mine floor away from the face and up over the ramp of the transport vehicle and along the guideway of the vehicle frame. When the skid assumes its loaded position on the transport vehicle, as shown in FIGS. 4 and 5, a driving element such as a gear 28 on the skid is engaged by a driving element such as a gear 29 on the vehicle which may also be driven by the motor 27. Under certain conditions a motor 30 (FIG. 1) carried by the skid may serve to drive the skid conveyor in lieu of the motor 27 and the gears 28 and 29.

The loaded vehicle may then be propelled by its crawler treads 20 to a suitable point remote from the face and the conveyor of the skid may then be operated by its motor to discharge the mineral from the skid at the outbye end of the transport vehicle onto a floor conveyor 31 or other receptacle, or into a suitable discharge chute, referred to in some claims as extraneous means. The transport vehicle then may be propelled by its crawler treads back to a point near the working face and the operations above described may be repeated. Thus the conveyor skid may be dragged back and forth with respect to its transport vehicle and may be shuttled while supported by its vehicle toward and from its discharge point.

As a result of this invention an improved mine haulage apparatus is provided especially designed for use in mines having very low headroom. By the provision of the improved shuttle mechanism with its low height conveyor skid and cable haulage means the skid may be rapidly moved back and forth over the mine floor with respect to the working face. By loading the conveyor skid onto a transport vehicle the skid may be rapidly shuttled toward and from its discharge point. The improved shuttle mechanism is relatively simple and inexpensive in design, well adapted to use in low vein mines and particularly in small mining operations such as truck mines. These and other advantages of the invention will be clearly apparent to those skilled in the art.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What I claim as new and desire to secure by Letters Patent is:

1. In a mine haulage apparatus, a relatively flat, low height floor engaging haulage unit having a horizontal plate movable over a mine floor and providing a large area imperforate load receiving surface, a load carrying conveyor arranged lengthwise of said unit and guided thereon for moving material along said plate to discharge material from said plate, a mobile transport vehicle having a unit receiving guideway along which said unit may move during its movement toward and from transport position on and off from said vehicle, flexible draft means on said vehicle having flexible connections extending from said vehicle above the guideway thereof and attached to the opposite ends of said unit for moving the latter back and forth with respect to its transport position on said vehicle and the working face, and driving means carried by said vehicle engageable with driving means on said unit for driving said unit conveyor when said loaded unit is in transport position on said vehicle, said driving means being effective to drive said conveyor only when said unit is in its rearmost transport position on said vehicle and said driving means being released upon movement of said unit forwardly from its transport position on the vehicle.

2. In combination, a mobile transport vehicle having a frame, ground engaging supporting, propelling and steering means for said frame, said frame providing a forwardly extending longitudinal guideway, a relatively flat conveyor-haulage unit movable over a mine floor and rearwardly and upwardly along said guideway onto said vehicle frame, said unit adapted to receive material to be transported thereon and having a low height conveyor extending along the bottom thereof and a driving element for said conveyor, and a motor driven element on said vehicle with which said conveyor driving element engages when said haulage unit is in transport position on said vehicle, said elements when in engagement serving to drive said conveyor to discharge the material from the haulage unit while the latter remains in transport position on said vehicle.

3. The combination as set forth in claim 2 wherein said transport vehicle has an open rear end whereby said haulage unit conveyor may be operated to discharge the material hauled by said haulage unit rearwardly from said vehicle.

4. A combination as set forth in claim 2 wherein said conveyor-haulage unit is in the form of a skid slidable over the mine floor.

5. In a mine haulage apparatus, a relatively flat, low height floor engaging unit having a horizontal plate movable over a mine floor and providing a large area imperforate load receiving surface on which a load of loose mined out material is received when said unit is located on the floor at the working face, a conveyor arranged lengthwise of said unit and guided thereon for moving material along said plate to discharge material from said plate, a self propelled mobile transport vehicle having a unit receiving guideway along which said unit may travel during its movement toward and from transport position on and off from said vehicle, said vehicle operating to transport said loaded unit thereon to a remote point of discharge, means on said vehicle having connections attached to said unit for moving the latter back and forth with respect to its transport position on said vehicle and the working face, said unit when in transport position on said vehicle having its discharge end so arranged with respect to the vehicle that said conveyor may discharge the material on said unit directly from said vehicle onto extraneous means, and means operative only when said unit is in its stationary transport position on said vehicle for operating said conveyor to discharge the material on said unit from said vehicle, said unit-conveyor constituting the sole means for discharging the material on said unit from the vehicle.

6. In a mine haulage apparatus, a low height, relatively flat haulage unit movable on its own bottom over the floor of a mine and having a flat, non-perforate, load receiving surface, an endless conveyor of low height extending lengthwise of said haulage unit near the floor surface with the top run of said conveyor extending along said load receiving surface, said unit disposable close to the working face of a mine vein to receive on said surface the mineral dislodged from the working face, means for moving said unit longitudinally back and forth relative to the working face and to and from a remotely located discharge point, said moving means comprising a mobile transport vehicle having a longitudinal guideway for receiving said unit and a flexible draft mechanism on said transport vehicle having flexible connections attachable to the opposite ends of said unit and a guide for one of said flexible connections located at the working face, and means for operating said conveyor to discharge the load of mineral from said unit, said conveyor operating means comprising motor operated driving means on said vehicle engaging driving means on said unit to drive said conveyor of said unit only when the latter is in transport position on said vehicle.

7. A haulage vehicle as set forth in claim 6 wherein said driving means on said vehicle comprises a driving element of said driving means with which a driven element on said haulage unit moves into engagement as said unit reaches its transport position on said vehicle, said driven element moving out of engagement with said driving element as said unit moves away from its transport position.

8. In combination, a mobile transport vehicle for a haulage unit and comprising a frame, ground engaging supporting, propelling and steering means for said frame, said frame providing a longitudinal guideway extending forwardly at a small angle down between said supporting, propelling and steering means for receiving a haulage unit from the mine floor, a flat low height haulage unit receivable on said frame for transport by the vehicle to a remote point of discharge, said haulage unit receiving the material to be transported and having an unloading conveyor extending along its bottom, said haulage unit when in transport position on said vehicle having its discharge end so arranged with respect to said vehicle that said conveyor may discharge the material on said unit directly from said vehicle onto extraneous means, and means for operating said conveyor only when said unit is in transport position on said vehicle to discharge the material from said unit and rearwardly from said vehicle, said conveyor constituting the sole means for discharging the material on said unit from said vehicle.

9. In a mine haulage apparatus, a relatively flat, low height floor engaging haulage unit having a horizontal plate movable over a mine floor and providing a large area imperforate load receiving surface for receiving a load of loose mined-out material at the working face, a conveyor arranged lengthwise of said unit and guided thereon for moving material along said plate to discharge material from said plate, a self propelled mobile transport vehicle having a unit receiving guideway extending forwardly therefrom and along which said unit may slide during its movement toward and from transport position on and off from said vehicle, said vehicle adapted to transport the loaded unit to a remote point of discharge, means on said vehicle having connections attached to said unit for moving the latter back and forth with respect to its transport position on said vehicle and the working face, said vehicle guideway receiving said loaded unit directly from the mine floor at one end of said vehicle and said unit having its discharge end so arranged with respect to said vehicle that said conveyor may operate to discharge the material on said unit directly from said vehicle onto extraneous means, said conveyor operative to discharge the material-load from said vehicle at the opposite end of said vehicle while said unit remains stationary in said transport position, said conveyor constituting the sole means for discharging the material on said unit from said vehicle, and means for operating said conveyor only when said unit is in its transport position on said vehicle.

10. A mine haulage apparatus as set forth in claim 9 wherein said vehicle has means constructed and arranged to direct the material rearwardly therefrom as the material is discharged by said conveyor longitudinally from said unit.

11. In a mine haulage apparatus, a haulage unit movable over the floor of a mine and having a load receiving surface for receiving a load of loose material when said unit is located at the working face, a conveyor arranged lengthwise of said unit and guided thereon for moving material along said surface to discharge the material from said unit, a mobile transport vehicle having a guideway for receiving said unit and along which said unit may move toward and from transport position on said vehicle, means on said vehicle having connections with said unit for moving the latter back and forth with respect to its transport position on said vehicle and its material receiving position at the working face, said vehicle adapted to transport said loaded unit to a remote point of discharge, and driving means on said vehicle engageable with driving means on said unit for driving said conveyor when said loaded unit is in transport position on said vehicle for effecting discharge of material from the vehicle, said driving means being effective to drive said conveyor only when said unit is in its transport position on said vehicle, and said driving means being released upon movement of said unit along said guideway from its transport position on said vehicle.

12. In a mine haulage apparatus, a haulage unit movable over the floor of a mine and having a load receiving surface for receiving a load of loose material when said unit is located at the working face, an endless conveyor extending lengthwise of said haulage unit along said load receiving surface, a mobile transport vehicle for said haulage unit, means for moving said unit longitudinally back and forth relative to the working face and into and out of transport position on said vehicle, comprising mechanism on said vehicle having connections attached to said haulage unit, said vehicle adapted to transport said loaded unit to a discharge point located remote from the working face, said haulage unit when in transport position on said vehicle having its discharge end so arranged with respect to said vehicle that it may discharge the material thereon directly from the vehicle onto extraneous means, and means for operating said conveyor when said loaded unit is in transport position on said vehicle at said discharge point for discharging the material on said unit from said vehicle.

13. In a mine haulage apparatus, a haulage unit movable over the floor of a mine and having a load receiving surface for receiving a load of loose material when said unit is located at the working face, an endless conveyor extending lengthwise of said haulage unit along said load receiving surface, a mobile transport vehicle for said haulage unit, means for moving said unit longitudinally back and forth relative to the working face and into and out of transport position on said vehicle comprising mechanism on said vehicle having connections attached to said haulage unit, said vehicle adapted to transport said loaded unit to a discharge point located remote from the working face, and means for operating said conveyor when said loaded unit is in transport position on said vehicle at said discharge point for discharging the material on said unit from said vehicle, said conveyor operating means for effecting discharge of the material from said vehicle comprising motor operated driving means on said vehicle engaging driving means on said haulage unit for driving said conveyor only when said unit is in transport position on said vehicle and which driving means is automatically disconnected when said unit moves from its transport position on said vehicle.

References Cited in the file of this patent

UNITED STATES PATENTS

| | | |
|---|---|---|
| 1,218,908 | Shutt | Mar. 13, 1917 |
| 1,498,506 | Buffum | June 17, 1924 |
| 1,576,910 | Hudson | Mar. 16, 1926 |
| 1,677,733 | Schiftner | July 17, 1928 |
| 1,821,438 | Levin | Sept. 1, 1931 |
| 1,870,573 | Kuchar | Aug. 9, 1932 |
| 1,966,866 | Miller | July 17, 1934 |
| 2,075,505 | Crawford et al. | Mar. 30, 1937 |
| 2,143,522 | McCarthy | Jan. 10, 1939 |
| 2,161,818 | Joy | June 13, 1939 |
| 2,186,463 | Maine | Jan. 9, 1940 |
| 2,242,206 | Bisset | May 20, 1941 |
| 2,254,181 | Joy | Aug. 26, 1941 |
| 2,338,359 | Sharp | Jan. 4, 1944 |
| 2,354,360 | Bigelow | July 25, 1944 |
| 2,467,354 | Baldwin | Apr. 12, 1949 |
| 2,543,518 | Baechli | Feb. 27, 1951 |
| 2,569,004 | Joy | Sept. 25, 1951 |
| 2,745,566 | Bouffard | May 15, 1956 |
| 2,962,176 | Russell | Nov. 29, 1960 |